United States Patent [19]

Wymore et al.

[11] 3,792,441

[45] Feb. 12, 1974

[54] MICRO-PROGRAM HAVING AN OVERLAY MICRO-INSTRUCTION

[75] Inventors: Charles E. Wymore, Santa Barbara; Paul R. LeCain, Goleta, both of Calif.

[73] Assignee: Burroughs Corporation, Detroit, Mich.

[22] Filed: Mar. 8, 1972

[21] Appl. No.: 232,880

[52] U.S. Cl. .................................... 340/172.5

[51] Int. Cl. .................................... G06f 9/16

[58] Field of Search .................................... 340/172.5

[56] References Cited

UNITED STATES PATENTS

| | | | |
|---|---|---|---|
| 3,478,322 | 11/1969 | Evans | 340/172.5 |
| 3,696,340 | 10/1972 | Matsushita et al. | 340/172.5 |
| 3,325,788 | 6/1967 | Hackl | 340/172.5 |
| 3,569,938 | 3/1971 | Eden et al. | 340/172.5 |
| 3,391,394 | 7/1968 | Ottaway et al. | 340/172.5 |
| 3,585,600 | 6/1971 | Saitini | 340/172.5 |

*Primary Examiner*—Harvey E. Springborn
*Attorney, Agent, or Firm*—Christie, Parker & Hale

[57] ABSTRACT

There is described a micro-programmed data processor having, in addition to the main memory, a memory for currently used strings of micro-operators in which any portion of the latter memory can be overlayed from main memory by a unique micro-instruction that is handled as one more micro step in whatever micro-string is being executed. Once the overlay is complete, the next micro-operation in sequence is executed. This micro-operator may be from the previously stored micro-operator string or from the overlayed instructions, depending upon where the overlay is positioned in the memory.

3 Claims, 2 Drawing Figures

MICRO-PROGRAM HAVING AN OVERLAY MICRO-INSTRUCTION

FIELD OF THE INVENTION

This invention relates to micro-program data processors, and more particularly, is concerned with such data processor having a separate memory for storing micro-instructions.

BACKGROUND OF THE INVENTION

Micro-programmed processors are well known in which the usual machine instructions are arranged to be executed as a series of basic operational steps. These steps, referred to as micro-operations, are defined by the control logic. By changing the steps involved in the execution of an instruction, the instruction can be modified.

In the past some micro-programmed processors have utilized a micro-instruction store, generally referred to as a "read-only" memory, in which the micro-operators are permanently stored. The micro-operators are read out of the permanent store in a controlled sequence in executing each machine instruction. Examples of micro-programmed processors utilizing read-only memories may be found in U.S. Pat. Nos. 3,325,788 and 3,518,632. In such systems utilizing a read-only memory, the intrinsic micro-programmed modifications cannot be carried out automatically under entrinsic programmed control. It has heretofore been proposed to utilize a Read/Write or erasable type storage to provide micro-programmed control which would permit micro-programmed modifications to be carried out automatically under extrinsic programmed control. This gives the programmer the ability to modify the micro-operators, thereby allowing the programmer to modify machine control. An example of a micro-programmed processor utilizing a Read/Write memory is shown in Pat. No. 3,478,322.

Micro-program processors utilizing a Read/Write memory for storing micro-instructions present a problem of how to control the machine while the memory, which serves as the micro-program control, is itself being modified. One arrangement is to provide a separate "load" operation by which the memory is loaded from tape, disc, or other memory in response to a special wired-in load control that is activated by the operator of the machine. This means that the normal operation of the processor is interrupted during the loading operation and the prior condition of the processor control is replaced by the new control provided by the newly inserted micro-instructions. In the process described in U.S. Pat. No. 3,478,322, for example, two or more micro-control stores are provided so that one stored micro-program can be used to control the processor during the time the processor is loading the other store from any one of several sources, such as the main memory. Such a system has the disadvantage that multiple stores are required with the attendant complexity of switching control from one store to another.

The present invention provides an improved micro-programmed processor utilizing a Read/Write store for the micro-instructions being executed in which any selected group of micro-instructions in the store can be replaced and overlayed by a new group of micro-instructions in response to one micro-instruction from the same store. The arrangement of the present invention permits this to be accomplished without necessarily modifying the string of micro-instructions being executed at the time the overlay takes place.

SUMMARY OF THE INVENTION

The present invention is directed to a micro-programmed processor of the type described in co-pending application Ser. No. 157,297, filed June 29, 1971, in the name of Roger E. Packard and assigned to the same assignee as the present invention. The processor has a common data transfer bus to which the arithmetic section, the main memory, and a number of operational registers are coupled. Micro-instructions are stored in and executed from a high-speed memory, referred to as an M-memory.

According to the present invention a micro-instruction, called Overlay, provides an overlay of any portion of the M-memory from the main memory with a new set of micro-instructions. The parameters for execution of the overlay micro-instruction are: the starting address of the portion to be overlayed in the M-memory, the starting address of a field of micro-instructions in the main memory, and the length of the field to be overlayed. These parameters are stored in specific registers prior to execution of the Overlay instruction. The Overlay instruction stores the address of the next micro-instruction in a temporary storage and replaces it with the starting address of the portion of the M-memory being overlayed. A new set of micro-instructions are then transferred sequentially beginning with the specified starting address location in main memory to the portion of the M-memory being at the specified starting address. When the end of the field in main memory is reached or the maximum possible address location in the M-memory is reached, the transfer terminates and the address of the next micro-instruction is returned from the temporary storage to select the next micro-instruction in the prior sequence from the M-memory. The Overlay instruction is then replaced by the micro-instruction in the next location in sequence in the M-memory for execution by the processor. This location may or may not be within the overlayed field in the M-memory.

BRIEF DESCRIPTION OF THE DRAWINGS

For a more complete understanding of the invention reference should be made to the accompanying drawing, wherein.

DETAILED DESCRIPTION

Figure 1:
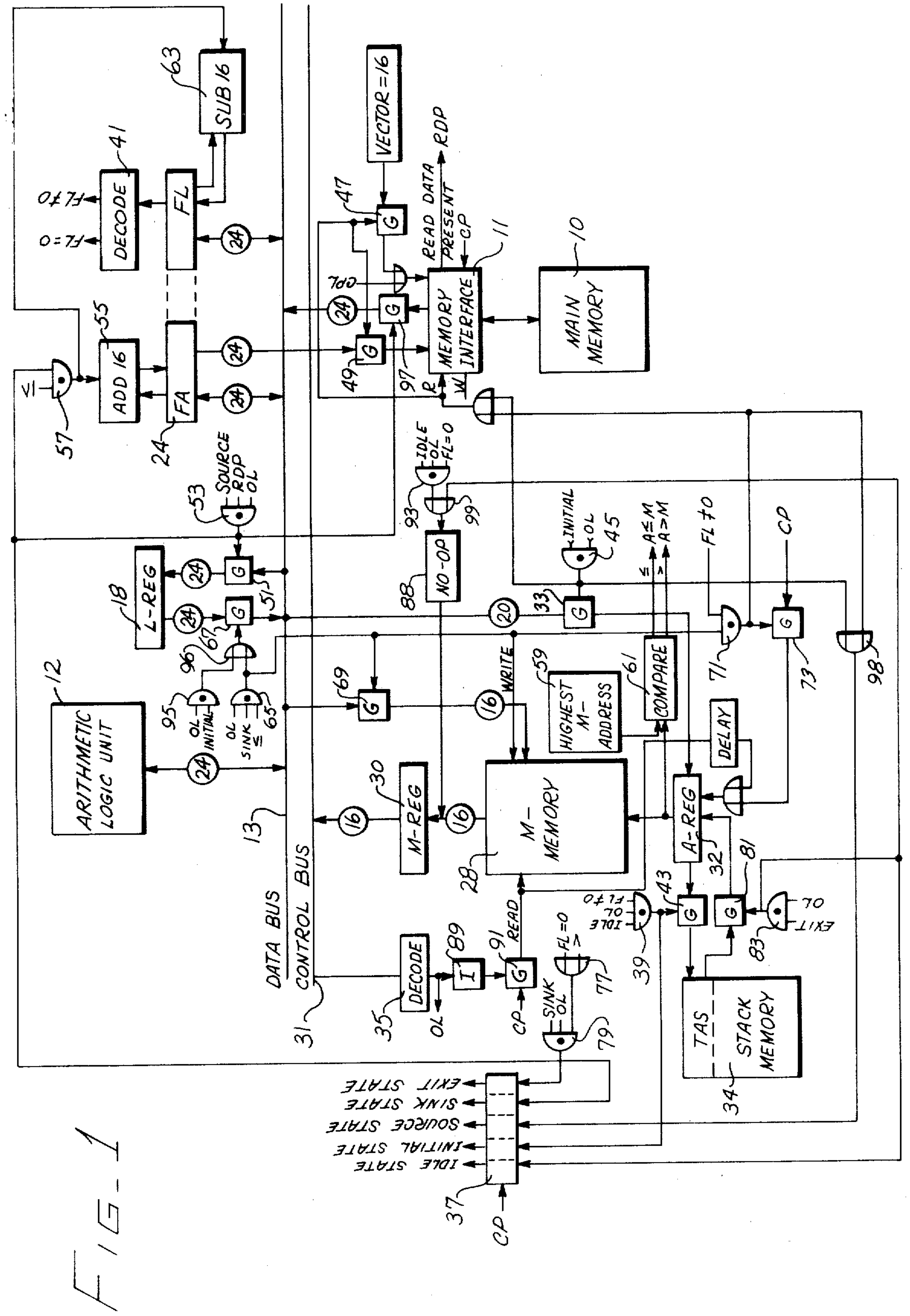
FIG. 1 is a schematic block diagram of the micro-programmed processor incorporating the features of the present invention.

Referring to the drawing in detail there is shown a block diagram of the processor including a main memory 10 and a memory interface control 11 which controls transfer of data between the main memory 10 and a data transfer bus 13. The main memory 10 and memory interface control 11 are shown and described, by way of example, as operating as a "free-field" memory, that is, an addressable memory which can be addressed by specifying a bit boundary address and a bit number. A memory cycle permits a group of bits to be written in or read out of memory in parallel starting at the specified bit boundary location and including the specified number of bits. While a free-field memory is shown by way of example as the preferred embodiment, the present invention does not specifically require a free-field memory, but is equally applicable to use with any conventional word addressable memory, such as a conventional coincident core memory. For a detailed teaching of the operation of a free-field memory see U.S. Pat. No. 3,680,058 wherein each of the memory modules therein described includes a memory storage unit (MSU) and field isolation unit FIU which correspond respectively to the main memory 10 and memory interface 11 of the present application. The data bus is arranged to transfer up to 24 bits in parallel between main memory and a plurality of registers connected to the data bus. These include operand registers within an arithmetic and logic unit 12 of a type described in detail in copending application Ser. No. 157,091, filed June 28, 1971, in the name of William A. Koehn, and assigned to the same assignee as the present invention. A 24 bit operational register 18, called the L-register, provides a temporary storage for receiving data from or applying data to the data bus. Descriptors defining fields in the main memory 10 are stored in an F-register 24 which has an FA section and an FL section. The FA section is used to store the bit boundary address of a location in main memory. The length of the field is specified by the FL Section of the F-register 24. The memory interface 11 in response to a Read or Write signal initiates a transfer of any number of bits up to a maximum of 24 in parallel between the main memory 10 and the data bus. The number of bits transferred is controlled in response to an input to the memory interface 11 designated CPL, in the manner described in detail in the above-identified copending applications.

Control of the processor is by means of strings of micro-instructions which are stored in a random access high-speed M-string memory 28, such as a MOS memory or a core memory. Such a core memory suitable for use as the M-memory 28 which responds to a Read or Write (Fetch or Request) control signal and a coded address to transfer a word out of or into the memory is fully described in the book "Digital Computer Principles" 2nd Edition, McGraw-Hill, 1969 pgs. 344–356. The micro-instructions are transferred out of the M-string memory 28 one at a time into an M-register 30 from an address specified by an A-register 32. The micro-instructions are preferably 16 bits in length, the 16 bits in the M-register 30 being applied in parallel to a control bus 31 for distribution to control logic distributed throughout the processor and associated with the various registers, the arithmetic and logic network 12 and the memory interface control 11. The A-register 32 contains the number of bits necessary to address all the cells in the M-string memory 28, 20 bits being shown by way of example. Normally the A-register 32 is advanced by one each clock pulse, causing the next micro-operator in sequence to be transferred from the memory 28 into the M-register 30. The same clock pulse which causes the new micro-instruction to be transferred into the M-register 30 also causes the execution of the micro-instruction then present in the M-register 30. The A-register 32 may be loaded from the data bus 13 through a gate 33 to permit branching to a different location in the M-string memory 28. Associated with the A-register 32 is a register designated TAS.

To provide the Overlay operation, the parameters necessary to define the start and length of the field in main memory 10 where the micro-instructions are stored, and the location in the M-string memory in which overlayed micro-instructions begin, must first be established. A descriptor is loaded in the F-register 24 in a manner described in detail in the above-identified application Ser. No. 157,297, which specifies the bit boundary address of the start of the field in main memory 10 where the new set of micro-instructions is stored and specifies the length of the field in main memory 10 which contains the group of micro-instructions to be transferred to the M-string memory 28. The starting address in the M-string memory 28 where the overlay is to take place is loaded in the L-register 18. To provide complete flexibility for the programmer, the loading of these address and length parameters into the F-register 24 and into the L-register 18 may be accomplished in any order at any time (prior to the execution of the Overlay micro-instruction) by means of any of several literal-creation or data-transfer micro-instructions in the micro-program processor's repertoire.

After executing instructions out of the M-register 30 to load the necessary address and length parameters, eventually a next micro-instruction provided in the string stored in the M-memory 28 will be the Overlay micro-instruction. When this is received in the M-register 30 from the M-string memory 28, it is coupled over the control bus 31 to a decoding circuit 35 which senses the 16 bits in the M-register 30 and determines that an Overlay micro-instruction is present. The output of the decoder provides a level designated OL which signals the control logic that the Overlay micro-instruction is present in the M-register 30.

The control logic of the Overlay instruction includes a sequence counter 37 which has five states referred to as the IDLE, the INITIAL, the SOURCE, the SINK, and the EXIT states, respectively. With sequence counter 37 initially in the IDLE state, and the Overlay instruction present, the control first transfers the address in the A-register 32 into the TAS register if the field length in the FL-register 24 is non-vacuous, otherwise the Overlay instruction will terminate in a manner described hereinafter. A logical AND circuit 39 senses that the OL output from the decode circuit 35 is true, that the sequence counter 37 is in the IDLE state, and that the field length specified by the FL portion of the F-register 24 is not equal to zero, i.e., FL $\neq$ 0. This latter signal is derived from a decode circuit 41 associated with the FL section of the F-register 24, the decode circuit 41 sensing when FL = 0 or FL $\neq$ 0 and providing signals on the corresponding output lines. When the output of the logical AND circuit 39 is true, it opens a gate 43 allowing the contents of the A-register 32 to be transferred to the TAS register with the next clock pulse. At the same time, the output of the AND circuit 39 sets the sequence counter 37 to the INITIAL state in synchronism with the same clock pulse.

During the INITIAL state the address in the L-register 18 passes over the data bus 13 and is loaded into the A-register 32 through the simultaneous actions of gates 67 and 33. The address is placed on the data bus 13 by gate 67 under the control of AND circuit 95, which senses that the Overlay instruction is present and that the sequence counter is in the INITIAL state, acting through OR circuit 96 as one of two independent gating causes. The address is taken from the data bus 13 by gate 33 under the control of AND circuit 45, which likewise senses that the Overlay instruction is present and that the sequence counter is in the INITIAL state. The output of the AND circuit 45 is also applied to a gate 47 which applies the vector length input of 16 bits into the memory interface 11, indicating that a 16 bit transfer is to take place from main memory 10. Also the bit boundary address is transferred from the FA portion of the F-register 24 by means of a gate 49 to the memory interface 11. At the same time a memory Read operation is signaled to the memory interface 11, initiating a memory Read operation. This causes the first 16 bits, starting at the designated address boundary to be transferred from main memory 10 through the memory interface 11 to the data bus at some later time under the control of the Read Data Present signal while the Overlay sequence counter waits in the SOURCE state. The output of the AND circuit 45 is also applied to the sequence counter 37 through OR circuit 98 to advance it to the aforementioned SOURCE state with the next clock pulse.

During the SOURCE state, the 16 bits placed on the data bus 13 from the main memory 10, corresponding to the first micro-instruction to be overlayed in the M-string memory, are gated into the L-register 18 temporarily in order to free the main memory 10 for other possible uses by other memory interface(s) 11 contained in, and responsive to the independent needs of, other memory-using devices besides the micro-programmed data processor herein alluded to. To accomplish this micro-instruction transfer from the memory interface 11 to the L-register 18 over the data bus 13 both gates 97 (putting data onto the bus) and 51 (taking data from the bus) are simultaneously opened in response to, and under the control of, the logical AND circuit 53 which senses that the Overlay instruction OL is being executed and that the sequence counter is in the SOURCE state. The AND circuit 53 also senses that the data being read out of main memory 10 is present at the memory interface 11 as indicated by the arrival of an output signal from the memory interface 11 designated Read Data Present (RDP). Also during the SOURCE state, the bit boundary address is conditionally incremented by 16 to give the address of the next successive micro-instruction in the field in main memory 10. This is accomplished by an adder circuit 55 which is actuated in response to the output of an AND circuit 57 which senses the output of the AND circuit 53 and also the condition that the M-string memory is still within the limit of its capacity. This latter condition is determined by comparing the address in the A-register 32 with the highest available address in the M-string memory, as generated by a circuit 59, the two conditions being applied to a compare circuit 61. The compare circuit provides one of two output signals indicating whether the A-register is equal to or less than the constant corresponding to the highest available address in the M-string memory, or indicating whether the A-register contains an address which is greater than the highest available address in the M-string memory 28.

At the same time that the bit boundary address is incremented by 16, the field length is decremented by the same amount by means of a Subtract-16 circuit 63 that is also activated by the output of the AND circuit 57.

The output of the AND circuit 53 is used to advance the sequence counter 37 to the SINK state with the next clock pulse. During the SINK state, the new micro-instruction in the L-register 18 is transferred over the data bus 13 into the M-string memory 28 at the address specified by the A-register 32. To this end, a logical AND circuit 65 senses that the SINK state is present during execution of the Overlay instruction in the M-register 30, as indicated by OL, and that the compare circuit 61 indicates the A-register address has not exceeded the highest available address in the M-string memory. The output of the AND circuit 65 is applied to gate 67 through the OR circuit 96, as one of two independent gating causes, in order to place the contents of the L-register 18 onto the data bus 13. The output of this same AND circuit 65 is also applied to a gate 69 which transfers the 16 bits of the instruction from the data bus 13 to the M-string memory 28, and initiates a memory Write operation in the M-string memory. The output of the AND circuit 65 is also applied to an AND circuit 71 together with the FL $\neq$ 0 state from the decode circuit 41. If both conditions are true, the output of the AND circuit 71 actuates a gate 73 which passes the next clock pulse to the A-register 32 causing the A-register to be advanced by one to the next successive address in the M-string memory at the same time that the M-string memory Write operation is completed using the current address in this A-register 32. The output of the AND circuit 71 is also applied to the memory interface 11 to initiate another Read operation, and is also applied to the sequence counter 37 through OR circuit 98 to reset the sequence counter back to the SOURCE state. As a result, the entire Read/Store/-Write operation is repeated in that the next 16 bits are transferred from main memory into the M-string memory 28.

The above operation continues until one of two conditions result. Either the field length portion of the F-register 24 is decremented down to FL = 0 or the A-register 32 is counted up to an address that is higher than the highest available address in the M-string memory 28. These two conditions are applied through an OR circuit 77 to one input of a logical AND circuit 79 which also senses that the Overlay instruction is present in the M-register 30 and senses that the sequence counter 37 is in the SINK state. The output of the AND circuit 79, when true, causes the sequence counter 37 to advance from the SINK state to the EXIT state after allowing the AND circuit 65 to cause the Write of a 16-bit micro-instruction into the M-memory 28 if it (65) can; but in no case (because of AND circuit 71 being false) either advancing the address in the A-register 32 or initiating another Read memory cycle through the memory interface 11.

With the sequence counter 37 set to the EXIT state, the address of the next micro-instruction in the M-string memory 28 is transferred from the top of the stack memory 34 by means of a gate 81 to the A-register 32. The gate 81 is operated by the output of an AND circuit 83 which senses that the Overlay instruction is present and that the sequence counter is in the EXIT state. The output of the AND circuit 83 is applied also to a NO-OP circuit 88 through OR circuit 99. The NO-OP circuit, in response to an input signal, forces the M-register 30 into storing all zeros. This terminates the Overlay instruction causing the output OL from the decode circuit 35 to go false. As a result the output of an inverter 89 goes true allowing a clock pulse to be gated by a gate 91 to the Read input of the M-string memory 28. As a result the micro-instruction in the next location, as specified by the content of the A-register 32, is transferred into the M-register 30 for execution in the normal manner. The output of the AND circuit 83 also resets the sequence counter 37 back to the IDLE state.

In the event that an Overlay instruction is loaded into the M-register 30 and the field length for some reason is at 0, the M-register 30 is changed to a NO-OP condition. This action is provided by an AND circuit 93, acting through OR circuit 99, which senses that the Overlay instruction is present, that the field length designation in the FL portion of the F-register 24 is 0 (vacuous), and that the sequence counter 37 is in the IDLE state. The output of the AND circuit 93 activates the NO-OP circuit 88 thereby terminating the Overlay instruction, and causing the fetching of the next micro-instruction from the M-string memory 28 in the same manner (through gate 91 because of inverter 89 in response to decoder 35) as was used when the field length was non-vacuous.

Figure 2:
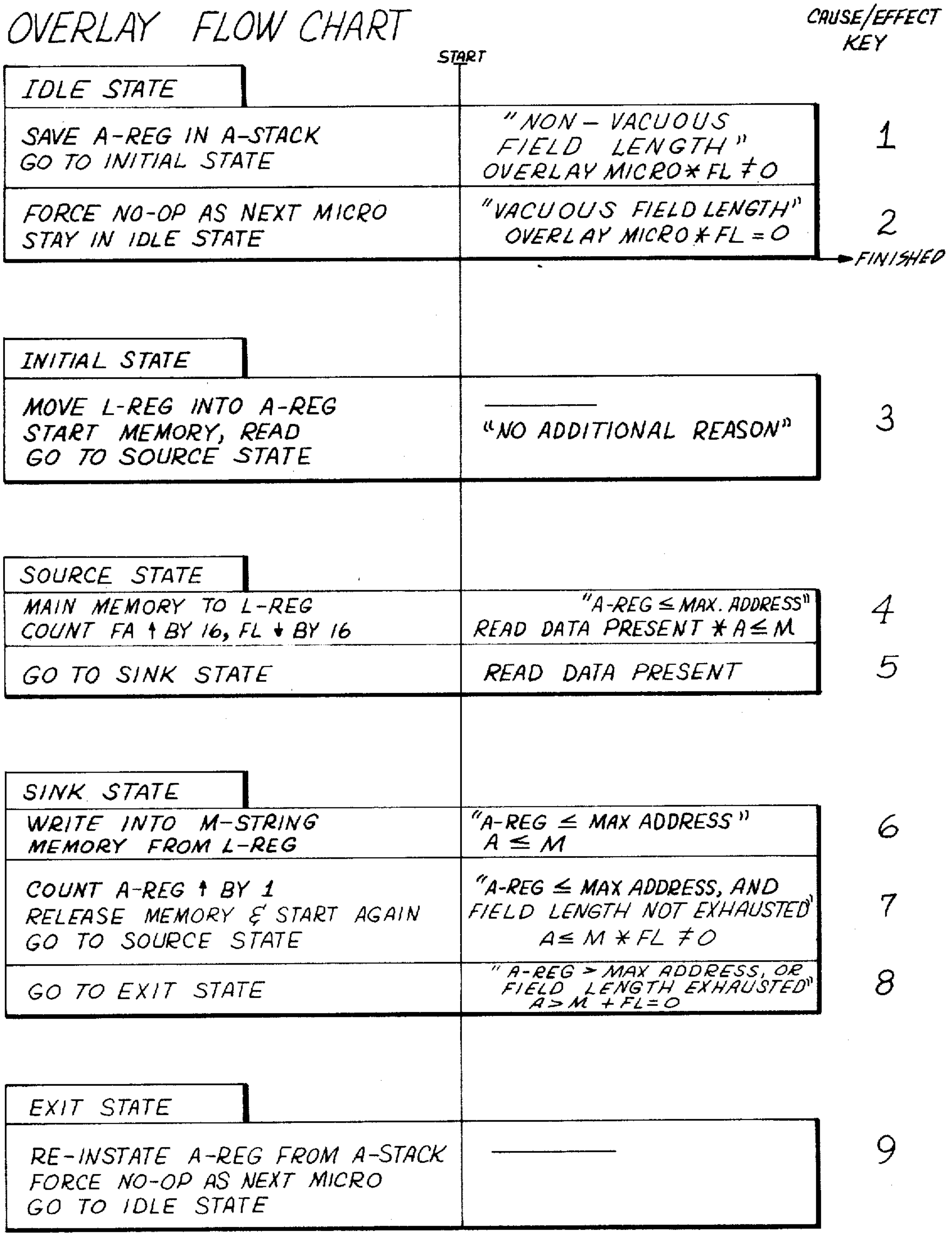
FIG. 2 is a flow diagram which summarizes the operation of the Overlay instruction.

The operation of the circuit of FIG. 1 is summarized by the flow chart of FIG. 2. The flow chart in the right-hand column shows the conditions which cause an operation to take place, as well as comments thereon; while the left-hand column summarizes the actions which take place during each of the five states of the sequence counter 37. At the start of the Overlay micro-instruction operation, the sequence counter is initially in the IDLE state. If FL $\neq$ 0, the address in the A-register is saved in the stack memory and the sequence counter goes to the INITIAL state. If the field length is 0 (FL = 0), a NO-OP is forced in the M-register 30 as the next micro-instruction and the sequence counter 37 remains in the IDLE state, the Overlay micro being thereby finished.

In the INITIAL state, the data sink pointer stored in the L-register 18 is transferred to the A-register. A main memory Read operation is initiated and the sequence counter 37 advances to the SOURCE state.

In the SOURCE state, when the data read out of main memory is present on the data bus and the A-register is not "out of bounds" the bit boundary address in the FA section of the register 24 is incremented by 16 while the field length is decremented by 16. The sequence counter then goes to the SINK state.

In the SINK state, if the A-register is still within bounds (A-Red $\leq$ Max Address), the micro-instruction is written into the M-string memory from the L-register and if, in addition, the field length is not down to 0, the A-register is counted up by 1, another main memory Read is initiated, and the sequence counter is returned to the SOURCE state. If either the A-register has exceeded the capacity of the M-string memory or if the field length has been reduced to 0, the sequence counter goes from the SINK state into the EXIT state.

During the EXIT state the A-register is reloaded from the stack memory, a NO-OP is forced into the M-register 30, and the sequence counter 37 returns to the IDLE state.

From the above description it will be seen that a micro-processor is provided in which any portion of the high-speed memory storing the micro-instructions can be overlayed from main memory. The Overlay micro-instruction is handled like any other micro-instruction as one more micro step of whatever program is being executed. When the Overlay micro-instruction terminates, control passes to the next micro-instruction of the program in which the overlay was imbedded. This next instruction may have already been in the string of micro-instructions in the M-register prior to execution of the overlay or may be an instruction placed in the M-memory as the result of the execution of the Overlay instruction. This results from the fact that in overlaying new micro-instruction strings in the M-string memory, the new block may start at any point in the M-string memory.

What is claimed is:

1. In a micro-programmed processor, apparatus comprising: an addressable main memory storing micro-instructions in fields, the micro-instructions in a field being stored in sequential address locations, an addressable auxiliary memory storing micro-instructions, a micro-instruction register, means including an address register for transferring micro-instructions in sequence from the auxiliary memory to the micro-instruction register, means setting the address register to the address of the next micro-instruction with each transfer of a micro-instruction to the micro-instruction register, a temporary storage unit, control means responsive to a predetermined micro-instruction in the micro-instruction register, the control means including means for transferring the address pointing to the location in the auxiliary memory of the next micro-instruction from said address register to the temporary storage unit, means for setting the address register to any predetermined address, and means for transferring micro-instructions sequentially from a field in the main memory to sequential address locations in the auxiliary memory, the sequential address locations in the auxiliary memory starting at said predetermined address in the address register, means sensing when the last micro-instruction in the field has been transferred to the auxiliary memory for resetting the address register to the address stored in the temporary storage unit.

2. Apparatus of claim 1 wherein said means sensing when the last micro-instruction is transferred includes a field length register storing the length of said field of micro-instructions to be transferred from the main memory to the auxiliary memory, means decrementing the contents of the field length register as each micro-instruction is transferred to the auxiliary memory, and means responsive to the field length register when the contents are decremented to zero for signaling that the complete field has been transferred.

3. Apparatus of claim 2 further including means sensing when the maximum capacity of the auxiliary memory is reached in transferring the micro-instructions from main memory into the auxiliary memory, and means sensing when the maximum capacity of the auxiliary memory is reached during the transfer of micro-instructions into the auxiliary memory for resetting the address register from the temporary storage unit.

* * * * *